United States Patent
Aoki et al.

(10) Patent No.: US 10,307,713 B2
(45) Date of Patent: Jun. 4, 2019

(54) AGENT AND METHOD FOR CLEANING PERMEABLE MEMBRANES

(71) Applicant: KURITA WATER INDUSTRIES LTD., Nakano-ku, Tokyo (JP)

(72) Inventors: Tetsuya Aoki, Tokyo (JP); Takahiro Kawakatsu, Tokyo (JP); Kunihiro Hayakawa, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 14 days.

(21) Appl. No.: 14/386,224

(22) PCT Filed: Apr. 9, 2013

(86) PCT No.: PCT/JP2013/060700
§ 371 (c)(1),
(2) Date: Sep. 18, 2014

(87) PCT Pub. No.: WO2013/179775
PCT Pub. Date: Dec. 5, 2013

(65) Prior Publication Data
US 2015/0045276 A1    Feb. 12, 2015

(30) Foreign Application Priority Data

May 30, 2012    (JP) ................ 2012-123378

(51) Int. Cl.
*B01D 65/02*    (2006.01)
*C11D 7/04*    (2006.01)
(Continued)

(52) U.S. Cl.
CPC ............ *B01D 65/02* (2013.01); *B01D 65/10* (2013.01); *C02F 1/441* (2013.01); *C11D 7/04* (2013.01);
(Continued)

(58) Field of Classification Search
CPC ...................................................... B01D 65/02
(Continued)

(56) References Cited

U.S. PATENT DOCUMENTS 6,454,871 B1 * 9/2002 Labib .................. A61C 1/0076
134/22.12
2008/0105281 A1 * 5/2008 Taylor ....................... B08B 3/00
134/22.19
(Continued)

FOREIGN PATENT DOCUMENTS

EP    1 287 741 A1    3/2003
JP    01-307407 A    12/1989
(Continued)

OTHER PUBLICATIONS

Charles Liu et al. Technical Report. Pall Corporation. 2002.*
(Continued)

*Primary Examiner* — Nicole M. Buie-Hatcher
*Assistant Examiner* — M. Reza Asdjodi
(74) *Attorney, Agent, or Firm* — Manabu Kanesaka

(57) ABSTRACT

The invention provides cleaning agents, cleaning liquids and cleaning methods that effectively remove contaminants which are impossible to remove sufficiently with conventional cleaning liquids at the occurrence of a decrease in performances such as permeation flux and salt rejection rate due to contamination of permeable membranes, in particular aromatic polyamide RO membranes used in water treatment. Permeable membranes are cleaned with a cleaning liquid which is an aqueous solution including a chloramine compound and an alkali agent and having a pH of 10 or above. The chloramine compound is preferably one obtained by mixing a compound having a primary amino group with hypochlorous acid and/or a hypochlorite.

12 Claims, 1 Drawing Sheet

(51) Int. Cl.
- *C11D 7/08* (2006.01)
- *C11D 7/10* (2006.01)
- *C11D 11/00* (2006.01)
- *B01D 65/10* (2006.01)
- *C02F 1/44* (2006.01)
- *C11D 7/06* (2006.01)
- *C11D 7/34* (2006.01)

(52) U.S. Cl.
CPC .................. *C11D 7/06* (2013.01); *C11D 7/08* (2013.01); *C11D 7/10* (2013.01); *C11D 7/34* (2013.01); *C11D 11/0041* (2013.01); *B01D 2321/164* (2013.01); *B01D 2321/168* (2013.01); *C02F 2303/16* (2013.01); *C02F 2303/20* (2013.01)

(58) Field of Classification Search
USPC ........................................................ 510/162
See application file for complete search history.

(56) References Cited

U.S. PATENT DOCUMENTS

| 2013/0026097 A1* | 1/2013 | Hirao et al. ............ 210/639 |
| 2015/0045276 A1* | 2/2015 | Aoki et al. ............. 510/162 |

FOREIGN PATENT DOCUMENTS

| JP | 09-057067 A | 3/1997 |
| JP | 2006-263510 A | 10/2006 |
| JP | 2006263510 A * | 10/2006 |
| JP | 2010-201312 A | 9/2010 |
| JP | 2010201312 A * | 9/2010 |
| WO | 2011/125764 A1 | 10/2011 |
| WO | WO 2011125764 A1 * | 10/2011 |

OTHER PUBLICATIONS

Xianhui et al. Journal of WaterSolubility. vol. 1< Issue 1, 139-151. Jun. 2011.*

PCT, "International Search Report for International Application No. PCT/JP2013/060700".

* cited by examiner

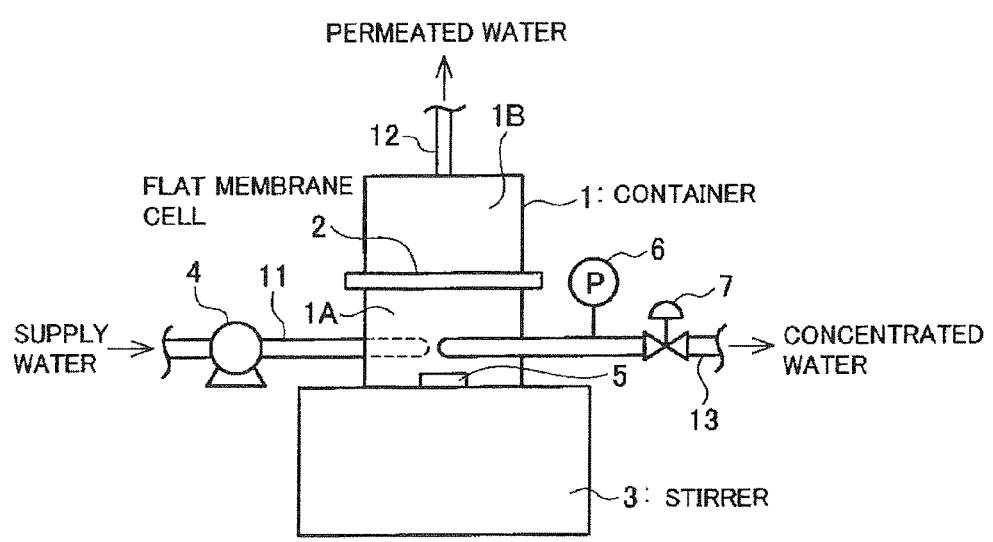

… (US 10,307,713 B2)

AGENT AND METHOD FOR CLEANING PERMEABLE MEMBRANES

FIELD OF INVENTION

The present invention relates to agents and methods for cleaning permeable membranes used in the field of water treatment. In detail, the invention relates to cleaning agents that effectively recover performances such as permeation flux and salt rejection rate decreased due to contamination of reverse osmosis (RO) membranes, in particular aromatic polyamide RO membranes. The invention also relates to cleaning liquids containing the cleaning agents, and methods for cleaning permeable membranes using the cleaning liquids.

BACKGROUND OF INVENTION

With global water supply shortage problems, RO membrane systems have been currently utilized to desalinate sea water and brine water as well as to recover wastewaters. These RO membrane systems encounter a problematic decrease in performances of RO membranes due to contamination. Thus, demands have been placed on the development of cleaning technique capable of effectively recovering performances of contaminated RO membranes.

Water treating RO membranes used widely in recent years are aromatic polyamide RO membranes which allow for low-pressure operation and exhibit excellent salt rejection performance. However, aromatic polyamide RO membranes have low chlorine resistance and cannot be placed in contact with chlorine under operation conditions unlike cellulose acetate RO membranes. Thus, contamination with microorganisms and organic matters is more likely to occur than in cellulose acetate RO membranes. On the other hand, aromatic polyamide RO membranes have higher alkali resistance than cellulose acetate RO membranes and can be cleaned under alkaline conditions at pH 10 or above.

Conventional cleaning agents which are known to be effective for cleaning such alkali-resistant aromatic polyamide RO membranes of contaminants such as microorganisms and organic matters include:

alkali agents (such as sodium hydroxide),
surfactants (such as sodium laurylsulfate), and
chelating agents (such as EDTA) (Non Patent Document 1).

However, it is sometimes the case that heavily contaminated RO membranes cannot be cleaned sufficiently by these chemical agents.

Sodium hypochlorite is a powerful chemical agent against microorganisms and organic matters. However, the low chlorine resistance of aromatic polyamide RO membranes precludes the use of sodium hypochlorite for the cleaning of aromatic polyamide RO membranes. It is known that when chlorine-based disinfectants are used, they are supplied to RO membranes after free chlorine is reduced with a reducing agent (Patent Document 1).

Patent Document 2 proposes a method of sterilizing and cleaning a membrane module in which the membrane module is cleaned with acid and is thereafter sterilized and cleaned with an oxidizing agent. The types of permeable membranes to be cleaned in Patent Document 2 are not explicitly described but are probably cellulose acetate RO membranes based on the fact that the initial rejection (salt rejection rate) of the membrane is 95%. Patent Document 2 does not disclose that the method is applied to RO membranes with decreased permeation flux or is performed under alkaline conditions.

CITATION LIST

Patent Document 1: Japanese Patent Publication H9-57067A
Patent Document 2: Japanese Patent Publication H1-307407A
Non-Patent Document 1: Measures against Deterioration and Membrane Fouling (published from NTS Inc.) p. 142, 2008

OBJECT AND SUMMARY OF INVENTION

An object of the invention is to provide cleaning agents, cleaning liquids and cleaning methods that can effectively remove contaminants which are impossible to remove sufficiently with conventional cleaning agents at the occurrence of a decrease in performances such as permeation flux and salt rejection rate due to contamination of permeable membranes, in particular aromatic polyamide RO membranes used in water treatment.

Solution to Problem

The present inventor carried out extensive studies in order to achieve the above object. As a result, the present inventor has found that a chloramine compound as a component in a chlorine-based cleaning agent exhibits suppressed oxidation effects on permeable membranes and such a cleaning agent can be used even for aromatic polyamide RO membranes having low chlorine resistance. The present inventor has found that alkaline aqueous solutions containing chloramine compounds not only exhibit removal effects under alkaline conditions as well as hydrolysis effects but also provide sterilization and organic matter decomposition effects due to the chloramine compounds, thus achieving good alkali cleaning effects.

The present invention has been completed based on the above findings. A summary of the invention is as follows.

[1] A cleaning agent for permeable membranes, wherein the cleaning agent consists of an aqueous solution including a chloramine compound and an alkali agent and having a pH of 13 or above.

[2] The cleaning agent for permeable membranes described in [1], wherein the aqueous solution has a pH of 13 or more and 15 or less.

[3] The cleaning agent for permeable membranes described in [1] or [2], wherein the aqueous solution has a concentration of the chloramine compound of 0.2 to 2 M and a concentration of the alkali agent of 1 to 3 M.

[4] The cleaning agent for permeable membranes described in any of [1] to [3], wherein the chloramine compound includes monochlorosulfamic acid.

[5] The cleaning agent for permeable membranes described in any of [1] to [4], wherein the chloramine compound is obtained by mixing one, or two or more compounds selected from the group consisting of compounds having a primary amino group, ammonia and ammonium salts (hereinafter, referred to as "$NH_2$ compound(s)"), with hypochlorous acid and/or a hypochlorite.

[6] The cleaning agent for permeable membranes described in [5], wherein the hypochlorous acid and/or the hypochlorite is mixed with the $NH_2$ compound in a $Cl_2/N$ molar ratio of 0.1 to 1 wherein $Cl_2$ indicates the concentration of effective chlorine derived from the hypochlorous acid and/or the hypochlorite and N indicates nitrogen atoms derived from the $NH_2$ compound.

[7] The cleaning agent for permeable membranes described in [5] or [6], which is obtained by dissolving the $NH_2$ compound in an aqueous solution of the alkali agent and admixing the hypochlorous acid and/or the hypochlorite with the resultant aqueous $NH_2$ compound solution.

[8] The cleaning agent for permeable membranes described in [7], wherein the aqueous solution of the alkali agent contains 50 to 90 wt % of water, the $NH_2$ compound is added such that the proportions of the alkali agent and the $NH_2$ compound satisfy a N/alkali metal ratio (by mole) of 0.5 to 0.7, and the hypochlorous acid and/or the hypochlorite is added as an aqueous solution having an effective chlorine ($Cl_2$) concentration of 5 to 20 wt %.

[9] A cleaning liquid for permeable membranes which is an aqueous solution obtained by diluting the cleaning agent described in any of [1] to [8] and having a pH of not less than 10.

[10] A cleaning liquid for permeable membranes which is an aqueous solution including a chloramine compound and an alkali agent and having a pH of 10 or above.

[11] The cleaning liquid for permeable membranes described in [9] or [10], wherein the aqueous solution has a pH of not less than 12 and less than 13.

[12] The cleaning liquid for permeable membranes described in any of [9] to [11], wherein the aqueous solution has a concentration of the chloramine compound of 0.005 to 0.5 M.

[13] A method for cleaning permeable membranes, including bringing a permeable membrane into contact with the cleaning liquid described in any of [9] to [12].

Advantageous Effects of Invention

According to the present invention, chlorine-based cleaning agent components can be applied even to aromatic polyamide RO membranes having low chlorine resistance. Thus, the invention realizes sterilization and organic matter decomposition effects due to chloramine compounds in addition to removal effects under alkaline conditions as well as hydrolysis effects. Consequently, good alkali cleaning effects are achieved to allow for effective recovery of performances of RO membranes.

BRIEF DESCRIPTION OF DRAWING

FIG. 1 is a schematic view illustrating a configuration of a flat membrane tester used in EXAMPLES.

DESCRIPTION OF EMBODIMENTS

Embodiments of the present invention will be described in detail hereinbelow.

A cleaning agent for permeable membranes of the invention is an aqueous solution including a chloramine compound and an alkali agent and having a pH of 13 or above. A cleaning liquid for permeable membranes of the invention is an aqueous solution obtained by diluting the cleaning agent and having a pH of not less than 10. In the following, the inventive cleaning agents for permeable membranes, and the cleaning liquids obtained by diluting the cleaning agents will be also referred to as "chloramine compound-containing aqueous alkali solutions".

<Cleaning Mechanism>

The chloramine compound is preferably a compound (XNHCl) in which a hydrogen atom of the amino group is replaced by a chlorine atom. Such compounds may be obtained by reacting hypochlorous acid (HOCl) and a compound having a primary amino group ($XNH_2$) as shown in Reaction Formulae (1) and (2) below. The compounds exhibit weak oxidation effects on RO membranes and thus can be used as cleaning agents even for aromatic polyamide RO membranes having low chlorine resistance.

$$XNH_2 + HOCl \leftrightarrow XNHCl + H_2O \quad (1)$$

$$XNH_2 + OCl^- \leftrightarrow XNHCl + OH^- \quad (2)$$

According to the present invention, it becomes possible to apply chlorine-based cleaning agents to cleaning of permeable membranes such as RO membranes under alkaline conditions. The invention adds sterilization and organic matter decomposition effects due to the chloramine compounds to the effects of removing organic matters under alkaline conditions as well as the hydrolysis effects. The invention enhances alkali cleaning effects and allows for effective recovery of performances of contaminated permeable membranes.

<Permeable Membranes>

The invention is effective for cleaning RO membranes, in particular aromatic polyamide RO membranes (including nanofiltration (NF) membranes) having low chlorine resistance. The permeable membranes to be cleaned are not limited to RO membranes such as aromatic polyamide RO membranes. The present invention can be applied also to the cleaning of ultrafiltration (UF) membranes and microfiltration (MF) membranes made of any materials without limitation. Further, forms and other configurations of the membranes are not limited. Thus, the present invention is effectively applied to the cleaning of permeable membranes for water treatment in a wide range of fields.

<Chloramine Compounds>

In the invention, a chloramine compound is used as a component in a chlorine-based cleaning agent. The chloramine compound is preferably formed by mixing any of compounds having a primary amino group, ammonia and ammonium salts (hereinafter, referred to as "$NH_2$ compound(s)"), with hypochlorous acid and/or a hypochlorite. Examples of the compounds having a primary amino group include aliphatic amines, aromatic amines, sulfamic acid, sulfanilic acid, sulfamoyl benzoic acid and amino acids. Examples of the ammonium salts include ammonium chloride and ammonium sulfate. These compounds may be used singly, or two or more may be used as a mixture. Of these $NH_2$ compounds, sulfamic acid ($NH_2SO_2OH$) is preferable. Sulfamic acid forms monochlorosulfamine, which is a stable chloramine compound. Because sulfamic acid contains no carbon atoms, the use thereof does not increase TOC of the cleaning agent. Combined use of sulfamic acid and an alkali agent produces a very effective cleaning agent.

The hypochlorites to be reacted with the $NH_2$ compounds may be alkali metal hypochlorites such as sodium hypochlorite, and alkaline earth metal hypochlorites such as calcium hypochlorite. These hypochlorites may be used singly, or two or more may be used as a mixture.

When a $NH_2$ compound is mixed with hypochlorous acid and/or a hypochlorite to form a chloramine compound, it is preferable that the $NH_2$ compound and the hypochlorous acid and/or the hypochlorite be used in such amounts that the $Cl_2/N$ molar ratio becomes 0.1 to 1 wherein $Cl_2$ indicates the concentration of effective chlorine derived from the hypochlorous acid and/or the hypochlorite and N indicates nitrogen atoms derived from the $NH_2$ compound. This molar ratio is preferable in terms of chloramine production efficiency and stability.

Here, the "$Cl_2$/N molar ratio" may be calculated as follows in the case of EXAMPLES 5 and 6 described later.

In EXAMPLE 5, 50 parts by weight of sodium hypochlorite (NaClO) with an effective chlorine concentration of 12 wt % is present in 100 parts by weight of a cleaning agent. Accordingly, the amount of effective chlorine ($Cl_2$) is 6 parts by weight. On the other hand, sulfamic acid is present in an amount of 18 parts by weight in 100 parts by weight of the cleaning agent. Since the molecular weight of effective chlorine ($Cl_2$) is 70.91 and that of sulfamic acid is 97.1, the $Cl_2$/N molar ratio in EXAMPLE 5 is calculated as follows:

$$Cl_2/N \text{ molar ratio} = (6/70.91)/(18/97.1) \approx 0.46$$

In EXAMPLE 6, 50 parts by weight of sodium hypochlorite (NaClO) with an effective chlorine concentration of 16 wt % is present in 100 parts by weight of a cleaning agent. Accordingly, the amount of effective chlorine ($Cl_2$) is 8 parts by weight. On the other hand, sulfamic acid is present in an amount of 18 parts by weight in 100 parts by weight of the cleaning agent. Accordingly, the $Cl_2$/N molar ratio in EXAMPLE 6 is calculated as follows:

$$Cl_2/N \text{ molar ratio} = (8/70.91)/(18/97.1) \approx 0.61$$

If the $Cl_2$/N molar ratio exceeds the upper limit, free chlorine may be generated. If the ratio is below the lower limit, the efficiency of chloramine production is lowered relative to the amount of the $NH_2$ compound used.

In this case, the amount of the hypochlorous acid and/or the hypochlorite determines the amount of the chloramine compound in the chloramine compound-containing aqueous alkali solution.

<Alkali Agents>

The alkali agents used in the inventive cleaning agents maintain solubility in the chloramine compound-containing aqueous alkali solutions. Examples of the alkali agents include alkali metal hydroxides such as sodium hydroxide and potassium hydroxide. The alkali agents may be used singly, or two or more may be used as a mixture.

<pH and Concentration of Chloramine Compounds>

A cleaning liquid of the invention is characterized in that it is a chloramine compound-containing aqueous alkali solution and has a pH of 10 or above. If the pH of the cleaning liquid is less than 10, permeation flux cannot be recovered sufficiently. The higher the pH of the cleaning liquid, the higher the cleaning effects. However, a cleaning liquid with an excessively high pH is difficult to handle and has a high risk of degrading permeable membranes such as RO membranes. The pH of the cleaning liquid is preferably not less than 12 and less than 13.

In the cleaning liquid that is a chloramine compound-containing aqueous alkali solution, the concentration of the chloramine compound is preferably 0.005 to 0.5 M, and particularly preferably 0.02 to 0.2 M. If the concentration of the chloramine compound is excessively low, the cleaning liquid cannot produce sufficient cleaning effects. Any excessively high concentration causes a risk that permeable membranes such as RO membranes may be degraded. A 0.005-0.5 M concentration of the chloramine compound corresponds to a total chlorine concentration of 355 to 35,500 mg-$Cl_2$/L. The total chlorine concentration may be measured by a DPD method in accordance with, for example, JIS K0400-33-10-1999.

Chloramine compounds are conventionally used as slime controlling agents for permeable membranes. As the slime controlling agents, chloramine compounds are usually used at a low concentration of about 1 to 50 mg-$Cl_2$/L in terms of total chlorine concentration. In such use, the pH is less than 10. In contrast, the inventive cleaning liquids contain chloramine compounds at the above high concentration and have a high alkaline pH of 10 or above, thereby achieving high cleaning effects.

Preferably, the cleaning agent of the invention is an aqueous solution including a chloramine compound and an alkali agent and having a pH of not less than 13, and preferably a pH of 13 to 15. In the aqueous solution, the concentration of the chloramine compound is preferably 0.2 to 2 M, particularly 1 to 2 M, and the concentration of the alkali agent is preferably 1 to 3 M. The cleaning agent is diluted with water (preferably pure water) to form an inventive cleaning liquid having the above pH and the above concentration of the chloramine compound.

<Methods for Producing Cleaning Agents and Cleaning Liquids>

The cleaning agents of the invention may be prepared by dissolving the $NH_2$ compound such as sulfamic acid in an aqueous solution of the alkali agent and admixing hypochlorous acid and/or the hypochlorite with the resultant aqueous $NH_2$ compound solution. The aqueous solution of the alkali agent preferably contains 50 to 90 wt % of water.

The compounds having a primary amino group such as sulfamic acid may be added in the form of salts. Examples of such salts include those which are soluble when the chloramine compound-containing aqueous alkali solutions are formed, such as sodium sulfamate, potassium sulfamate and ammonium sulfamate. The $NH_2$ compound is added such that the chloramine compound will have the above concentration in the inventive cleaning agent. Preferably, the $NH_2$ compound is added in such an amount that the proportions of the alkali agent and the $NH_2$ compound satisfy a N/alkali metal ratio (by mole) of 0.5 to 0.7. The $NH_2$ compound may be added as a powder or an aqueous solution. When a sulfamate is used as the $NH_2$ compound, the amount of the alkali metal forming the sulfamate is added to the amount of alkalis. When an aqueous solution is used, the amount of water in the aqueous solution is added to the amount of water in the aqueous alkali solution.

The hypochlorous acid and/or the hypochlorite is preferably added as an aqueous solution having an effective chlorine ($Cl_2$) concentration of 5 to 20 wt %, and preferably 10 to 15 wt %. The hypochlorous acid and/or the hypochlorite is added such that the concentration of the chloramine compound in the inventive cleaning agent falls in the aforementioned range as well as the proportions of the $NH_2$ compound and the hypochlorous acid and/or the hypochlorite satisfy the aforementioned $Cl_2$/N molar ratio. This configuration ensures that the generation of bubbles and chlorine odor does not occur and consequently the inventive cleaning agents that are aqueous solution formulations with excellent properties such as reactivity, stability, handling and chlorine odor freeness can be produced with high efficiency. In this case, it is preferable that the hypochlorous acid and/or the hypochlorite be admixed gradually with the $NH_2$ compound.

The cleaning liquid of the invention is produced by diluting the inventive cleaning agent with water, preferably pure water, such that the pH becomes not less than 10 and the concentration of the chloramine compound falls in the aforementioned preferred range. Alternatively, as will be described later in EXAMPLES, the inventive cleaning liquids may be produced directly by the above-described method, namely, while bypassing the formation of the inventive cleaning agent.

<Other Cleaning Agent Components>

The cleaning agents and the cleaning liquids used in the invention may contain other cleaning agent components as long as the cleaning effects are not deteriorated.

For example, one, or two or more kinds of chelating agents such as EDTA (ethylene diamine tetraacetic acid), EGTA (ethylene glycol bis(aminoethyl ether) tetraacetic acid) and IDA (iminodiacetic acid), and surfactants such as sodium laurylsulfate and sodium dodecylbenzenesulfate may be added in order to enhance the effects of removing contaminants from membranes.

The cleaning effects may be further enhanced by using polyol compounds having a molecular weight of not more than 1000, and preferably 60 to 1000. Such polyol compounds effectively penetrate into permeable membranes such as RO membranes and dissolve contaminants. Polyol compounds having a molecular weight exceeding 1000 can contribute to the contamination of permeable membranes such as RO membranes. Examples of the polyol compounds with a molecular weight of not more than 1000 include ethylene glycol, propylene glycol and polyethylene glycol (polymerization degree: 2 to 22). The polyol compounds may be used singly, or two or more may be used as a mixture.

Such polyol compounds may be added to the inventive cleaning agents or cleaning liquids, or may be used by being added to aqueous alkali solutions and aqueous acid solutions described below.

Before and/or after the cleaning of permeable membranes according to the invention, the membranes may be cleaned with other cleaning liquids. In combination with the cleaning of membranes with other cleaning liquids, the inventive cleaning can achieve further enhanced cleaning effects.

Before or after membranes are cleaned with the inventive cleaning liquid, namely, with the chloramine compound-containing aqueous alkali solution, the membranes may be cleaned with an aqueous alkali solution containing no chloramine compounds. The alkali agent in this aqueous alkali solution may be any of the alkali agents used in the chloramine compound-containing aqueous alkali solution. From the viewpoints of cleaning effects and handling, the pH of the aqueous alkali solution is preferably not less than 10, in particular 12 to 13.

Further, acid cleaning may be performed which is effective for removing scales and metallic colloids. For the acid cleaning, an aqueous solution containing one, or two or more acids such as hydrochloric acid, nitric acid, citric acid and oxalic acid may be used. From the viewpoints of cleaning effects and handling, the pH of the aqueous acid solution is preferably not more than 4, in particular 1 to 3.

<Cleaning Methods>

Methods for cleaning permeable membranes with the inventive cleaning liquid, namely, with the chloramine compound-containing aqueous alkali solution are not particularly limited as long as the permeable membranes are brought into contact with the chloramine compound-containing aqueous alkali solution. Immersion cleaning is usually adopted in which the chloramine compound-containing aqueous alkali solution is introduced into the raw water side of a permeable membrane module and the membrane is maintained in contact with the cleaning liquid. In this immersion cleaning, the chloramine compound-containing aqueous alkali solution in contact with the permeable membrane has a pH of not less than 10, preferably 12 to 13, and a concentration of the chloramine compound of 0.005 to 0.5 M, in particular 0.02 to 0.2 M.

Immersion cleaning similar to the above is usually adopted also when membranes are cleaned with the aforementioned aqueous alkali solution and aqueous acid solution before and/or after the cleaning with the chloramine compound-containing aqueous alkali solution.

Membranes may be immersed in the chloramine compound-containing aqueous alkali solution and other cleaning liquids for such a duration of time that a desired rate of recovery of membrane performances can be obtained. The immersion cleaning time is not particularly limited but is usually about 2 to 24 hours.

The cleaning sequence is not particularly limited in the case where membranes are cleaned with the chloramine compound-containing aqueous alkali solution in combination with the aqueous alkali solution and/or the aqueous acid solution. Metals which can catalyze chlorine can be reduced or eliminated when the acid cleaning with the aqueous acid solution is performed before the cleaning with the chloramine compound-containing aqueous alkali solution. The alkali cleaning with the aqueous alkali solution may be carried out before or after the cleaning with the chloramine compound-containing aqueous alkali solution. When the alkali cleaning with the aqueous alkali solution is performed after the cleaning with the chloramine compound-containing aqueous alkali solution, cleaning effects are supplemented by there being no risks of membrane degradation.

After the cleaning with the above cleaning liquids, the membranes are usually finish cleaned by passing high-purity water such as pure water through the membranes. The operation of the permeable membrane systems may then be restarted.

EXAMPLES

The present invention will be described in greater detail by presenting EXAMPLES and COMPARATIVE EXAMPLES below.

In EXAMPLES and COMPARATIVE EXAMPLES, a flat membrane tester illustrated in FIG. 1 was used to evaluate effects of cleaning RO membranes.

In the flat membrane tester, a high-pressure pump 4 pushes water to be supplied to a RO membrane via a pipe 11 into a raw water chamber 1A of a closed container 1 which is upstream from a flat membrane cell 2 in which the RO membrane has been set. In the flat membrane cell 2, the RO membrane is supported with a porous support plate on the permeated water side. The inside of the raw water chamber 1A upstream from the flat membrane cell 2 is stirred by rotation of a stirring element 5 by a stirrer 3. The water which has been permeated through the RO membrane is collected from a pipe 12 through a permeated water chamber 1B downstream from the flat membrane cell 2. The concentrated water is collected from a pipe 13. The pressure in the closed container 1 is adjusted by manipulating a pressure meter 6 and a pressure control valve 7 provided on a concentrated water collection pipe 13.

A 500 ppm aqueous sodium chloride solution as a cleaning effect evaluation water was supplied to the flat membrane tester and was passed through a RO membrane sample. The electrical conductivity of the permeated water and that of the concentrated water were measured, and the salt rejection rate of the RO membrane was calculated according to the following equation:

Salt rejection rate=1−electrical conductivity of permeated water/electrical conductivity of concentrated water The rate of recovery of RO membrane performances after cleaning was calculated according to the following equation based on the permeation flux of a new RO membrane without cleaning and the permeation flux of the RO membrane sample in the measurement of salt rejection rate.

Recovery rate=permeation flux of sample/permeation flux of new RO membrane without cleaning

Examples 1 to 4 and Comparative Examples 1 to 4

In EXAMPLES 1 to 4 and COMPARATIVE EXAMPLES 1 to 4, sodium hypochlorite was used in the preparation of cleaning liquids. This sodium hypochlorite was used as an aqueous sodium hypochlorite solution having an effective chlorine concentration of 5 wt %.

Aromatic polyamide RO membrane "ES20" manufactured by NITTO DENKO CORPORATION was attached to a RO membrane separation apparatus of a wastewater recovery system in an electronics production plant. The system was operated for 6 months. After the operation, the membrane was removed from the RO membrane separation apparatus as a contaminated flat RO membrane sample. This flat membrane sample was cut to a circle and was attached to the flat membrane tester illustrated in FIG. 1.

EXAMPLES 1 to 4 utilized a cleaning liquid that was a chloramine compound-containing aqueous alkali solution with a pH shown in Table 1 and a chloramine compound concentration of 0.03 M produced by reacting 0.04 M of a $NH_2$ compound described in Table 1 and 0.03 M of sodium hypochlorite in an aqueous sodium hydroxide solution ($Cl_2/N$ molar ratio=0.75).

To the flat membrane tester fitted with the RO membrane sample, the cleaning liquid was fed as supply water at an operation pressure (the pressure in the closed container) of not more than 0.2 MPa, and the membrane was cleaned by immersion cleaning for 15 hours. Thereafter, the membrane was rinsed with pure water under the same conditions and was finish cleaned by passing pure water through the membrane at an operation pressure of 0.75 MPa for 24 hours.

In COMPARATIVE EXAMPLE 3, the membrane sample was cleaned in the same manner as in EXAMPLES 1 to 4, except that an aqueous sodium hydroxide solution with pH 12.5 was used as the cleaning liquid.

In COMPARATIVE EXAMPLE 4, the membrane sample was cleaned in the same manner as in EXAMPLES 1 to 4, except that an aqueous sodium hydroxide solution with pH 12.5 containing 0.03 M sodium hypochlorite was used as the cleaning liquid.

After the cleaning, a 500 ppm aqueous sodium chloride solution was supplied as an evaluation water at an operation pressure of 0.75 MPa to measure the permeation flux (0.75 MPa, 25° C.). The salt rejection rate and the recovery rate were evaluated.

COMPARATIVE EXAMPLE 1 illustrates evaluation results of new RO membrane "ES20" without cleaning. COMPARATIVE EXAMPLE 2 illustrates evaluation results of contaminated RO membrane without cleaning.

The results are described in Table 1.

TABLE 1

| | Cleaning liquid | | Permeation | | Salt |
|---|---|---|---|---|---|
| | $NH_2$ compound | pH | flux ($m^3/m^2 \cdot day$) | Recovery rate | rejection rate |
| COMP. EX. 1 | New membrane without cleaning | | 0.85 | 1.00 | 0.98 |
| COMP. EX. 2 | Without cleaning | | 0.57 | 0.67 | 0.97 |
| COMP. EX. 3 | — | 12.5 | 0.65 | 0.76 | 0.97 |
| COMP. EX. 4 | * | 12.5 | 5.0 | 5.88 | 0.50 |
| EX. 1 | Sulfamic acid | 12.5 | 0.85 | 1.00 | 0.98 |
| EX. 2 | Sulfanilic acid | 12.5 | 0.80 | 0.90 | 0.98 |
| EX. 3 | Glycine | 12.5 | 0.82 | 0.92 | 0.98 |
| EX. 4 | Ammonia | 11.5 | 0.78 | 0.88 | 0.98 |

*Containing sodium hypochlorite

The following were demonstrated as shown in Table 1. The cleaning liquid containing sodium hydroxide alone achieved low recovery rate as illustrated in COMPARATIVE EXAMPLE 3. When sodium hypochlorite was used in combination therewith as shown in COMPARATIVE EXAMPLE 4, the membrane was degraded and the salt rejection rate was lowered. While sodium hypochlorite was used in EXAMPLES 1 to 4 with the same concentration as in COMPARATIVE EXAMPLE 4, the cleaning liquids successfully recovered the permeation flux without a decrease in salt rejection rate because the sodium hypochlorite had formed the chloramine compound together with the $NH_2$ compound.

Examples 5 and 6 and Comparative Examples 5 and 6

Example 5

A cleaning agent according to the invention was obtained by mixing an aqueous sodium hypochlorite solution having an effective chlorine concentration of 12 wt %, sulfamic acid, a 48 wt % aqueous sodium hydroxide solution and water with such proportions that the sodium hypochlorite:sulfamic acid:sodium hydroxide:water weight ratio became 50:18:23:9. The $Cl_2/N$ molar ratio in this cleaning agent was about 0.46. The cleaning agent was diluted 50 times with pure water. This dilution resulted in pH 12.2. To this, a 35 wt % aqueous hydrochloric acid solution was added to adjust the pH to 12, thereby preparing a cleaning liquid. The cleaning liquid was tested in the same manner as in EXAMPLES 1 to 4. The results are described in Table 2.

Example 6

A cleaning agent was obtained by mixing an aqueous sodium hypochlorite solution having an effective chlorine concentration of 16 wt %, sulfamic acid, a 48 wt % aqueous sodium hydroxide solution and water with such proportions that the sodium hypochlorite:sulfamic acid:sodium hydroxide:water weight ratio became 50:18:23:9. The $Cl_2/N$ molar ratio in this cleaning agent was about 0.61. The cleaning agent was diluted 50 times with pure water. This dilution resulted in pH 12.3. To this, a 35 wt % aqueous hydrochloric acid solution was added to adjust the pH to 12, thereby preparing a cleaning liquid. The cleaning liquid was tested in the same manner as in EXAMPLES 1 to 4. The results are described in Table 2.

Comparative Example 5

A cleaning agent was obtained by mixing a 48 wt % aqueous sodium hydroxide solution and water with such proportions that the sodium hydroxide:water weight ratio became 23:77. The cleaning agent was diluted 50 times with pure water. This dilution resulted in pH 12.1. To this, a 35 wt % aqueous hydrochloric acid solution was added to adjust the pH to 12, thereby preparing a cleaning liquid. The cleaning liquid was tested in the same manner as in EXAMPLES 1 to 4. The results are described in Table 2.

Comparative Example 6

A cleaning agent was obtained by mixing sodium laurylsulfate, a 48 wt % aqueous sodium hydroxide solution and water with such proportions that the sodium laurylsulfate:sodium hydroxide:water weight ratio became 1:23:76. The cleaning agent was diluted 50 times with pure water. This dilution resulted in pH 12.1. To this, a 35 wt % aqueous hydrochloric acid solution was added to adjust the pH to 12, thereby preparing a cleaning liquid. The cleaning liquid was tested in the same manner as in EXAMPLES 1 to 4. The results are described in Table 2.

TABLE 2

|  | Permeation flux ($m^3/m^2 \cdot day$) | Recovery rate | Salt rejection rate |
| --- | --- | --- | --- |
| EX. 5 | 0.84 | 0.99 | 0.98 |
| EX. 6 | 0.85 | 1.00 | 0.98 |
| COMP. EX. 5 | 0.63 | 0.74 | 0.97 |
| COMP. EX. 6 | 0.68 | 0.80 | 0.97 |

The following were demonstrated as shown in Table 2.

EXAMPLES 5 and 6 resulted in higher recovery rates than in COMPARATIVE EXAMPLES 5 and 6. The obtained salt rejection rates were also high and comparable to that of the new RO membrane without cleaning as demonstrated in COMPARATIVE EXAMPLE 1.

Although the present invention has been described in detail with respect to some specific embodiments, the skilled person will appreciate that various modifications are possible within the spirit and the scope of the invention.

This application is based upon a Japanese patent application filed on May 30, 2012 (Japanese Patent Application No. 2012-123378), the entire contents of which are incorporated herein by reference.

The invention claimed is:

1. A method for cleaning permeable membranes, comprising:
    contacting a permeable membrane with an aqueous solution comprising monochlorosulfamic acid having a concentration of 0.02 to 0.2M and an alkali agent for 2-24 hours, the aqueous solution having a pH of not less than 12 and less than 13 when the aqueous solution is contacting and cleaning the permeable membrane.

2. The method according to claim 1, further comprising contacting the permeable membrane with an aqueous alkali solution before the contacting of the permeable membrane with the aqueous solution,
    wherein the aqueous alkali solution contains one, or two or more kinds of alkali metal hydroxides, and does not contain a chloramine compound.

3. The method according to claim 1, further comprising contacting the permeable membrane with an aqueous alkali solution after the contacting of the permeable membrane with the aqueous solution,
    wherein the aqueous alkali solution contains one, or two or more kinds of alkali metal hydroxides, and does not contain a chloramine compound.

4. The method according to claim 1, further comprising contacting the permeable membrane with an aqueous acid solution before the contacting of the permeable membrane with the aqueous solution,
    wherein the aqueous acid solution contains one, or two or more acids selected from the group consisting of hydrochloric acid, nitric acid, citric acid, and oxalic acid, and does not contain a chloramine compound.

5. The method according to claim 4, wherein pH of the aqueous acid solution is 4 or less.

6. The method according to claim 1, further comprising contacting the permeable membrane with an aqueous acid solution after the contacting of the permeable membrane with the aqueous solution,
    wherein the aqueous acid solution contains one, or two or more acids selected from the group consisting of hydrochloric acid, nitric acid, citric acid, and oxalic acid, and does not contain a chloramine compound.

7. The method according to claim 1, further comprising contacting the permeable membrane with an aqueous alkali solution and an aqueous acid solution before the contacting of the permeable membrane with the aqueous solution,
    wherein the aqueous alkali solution contains one, or two or more kinds of alkali metal hydroxides, and does not contain a chloramine compound, and
    the aqueous acid solution contains one, or two or more acids selected from the group consisting of hydrochloric acid, nitric acid, citric acid, and oxalic acid, and does not contain a chloramine compound.

8. The method according to claim 1, further comprising contacting the permeable membrane with an aqueous alkali solution and an aqueous acid solution after the contacting of the permeable membrane with the aqueous solution,
    wherein the aqueous alkali solution contains one, or two or more kinds of alkali metal hydroxides, and does not contain a chloramine compound, and
    the aqueous acid solution contains one, or two or more acids selected from the group consisting of hydrochloric acid, nitric acid, citric acid, and oxalic acid, and does not contain a chloramine compound.

9. The method according to claim 1, further comprising contacting the permeable membrane with an aqueous alkali solution before the contacting of the permeable membrane with the aqueous solution, and
    contacting the permeable membrane with an aqueous acid solution after the contacting of the permeable membrane with the aqueous solution,
    wherein the aqueous alkali solution contains one, or two or more kinds of alkali metal hydroxides, and does not contain a chloramine compound, and
    the aqueous acid solution contains one, or two or more acids selected from the group consisting of hydrochloric acid, nitric acid, citric acid, and oxalic acid, and does not contain a chloramine compound.

10. The method according to claim 1, further comprising contacting the permeable membrane with an aqueous alkali solution after the contacting of the permeable membrane with the aqueous solution, and
    contacting the permeable membrane with an aqueous acid solution before the contacting of the permeable membrane with the aqueous solution,
    wherein the aqueous alkali solution contains one, or two or more kinds of alkali metal hydroxides, and does not contain a chloramine compound, and the aqueous acid solution contains one, or two or more acids selected from the group consisting of hydrochloric acid, nitric acid, citric acid, and oxalic acid, and does not contain a chloramine compound.

11. The method according to claim 1, wherein the permeable membrane is an aromatic polyamide RO membrane for a wastewater recovery system in an electronics production plant.

12. The method according to claim 1, wherein alkali agent does not contain chloramine.

* * * * *